US008615729B2

(12) United States Patent
Cornell et al.

(10) Patent No.: US 8,615,729 B2
(45) Date of Patent: Dec. 24, 2013

(54) EXTENDING EXISTING MODEL-TO-MODEL TRANSFORMATIONS

(75) Inventors: Kevin J. Cornell, Stittsville (CA); Eric O. Funk, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 2101 days.

(21) Appl. No.: 11/009,978

(22) Filed: Dec. 10, 2004

(65) Prior Publication Data

US 2006/0130011 A1 Jun. 15, 2006

(51) Int. Cl.
*G06F 9/44* (2006.01)
(52) U.S. Cl.
USPC .......................................................... 717/104
(58) Field of Classification Search
USPC ........................................ 717/104, 106, 136
See application file for complete search history.

(56) References Cited

U.S. PATENT DOCUMENTS

2006/0064667 A1* 3/2006 Freitas ........................... 717/104

OTHER PUBLICATIONS

Kurtev, I. and van den Berg, K. 2003. Model driven architecture based XML processing. In Proceedings of the 2003 ACM Symposium on Document Engineering (Grenoble, France, Nov. 20-22, 2003). DocEng '03. ACM, New York, NY, 246-248. DOI= http://doi.acm.org/10.1145/958220.958264.*
Ho, Wai Ming et al., "UMLAUT: an Extendible UML Transformation Framework", 14th IEEE International Conference on Automated Software Engineering (ASE'99) p. 275-79.*
Kurtev, I. and van den Berg, K. "Model driven architecture based XML processing." In Proceedings of the 2003 ACM Symposium on Document Engineering (Grenoble, France, Nov. 20-22, 2003). DocEng '03. ACM, New York, NY, 246-248. DOI= http://doi.acm.org/10.1145/958220.958264; 2003.*
Rensink, Arend (Editor), "Model Driven Architecture: Foundations and Applications", CTIT Technical Report TR-CTIT-03-27, University of Twente, Jun. 27, 2003.*
The Value of Modeling; Nov. 15, 2004; pp. 1-6; An abstract of this article may be found at http://www-106.ibm.com/developerworks/rational/library/nov04/naiburg-cernosek/index.html.
Alan Brown; An Introduction to the IBM Rational Design & Construction Tool Strategy; Nov. 15, 2004; pp. 1-7.
Will MDD Fulfill Its Promises?; IEEE Computer Society, pp. 5-7.
Dan Matheson, et al; Managed Evolution of a Model Driven Development Approach to Software-Based Solutions; OOPSLA & GPCE Workshop 2004: Best Practices for Model Driven Software Development; pp. 1-19.

* cited by examiner

*Primary Examiner* — Li B Zhen
*Assistant Examiner* — Ryan Coyer
(74) *Attorney, Agent, or Firm* — Steven M. Greenberg, Esq.; Carey, Rodriguez, Greenberg & O'Keefe

(57) ABSTRACT

A method, system and apparatus for extending an existing model-to-model transformation. A method for extending a model-to-model transformation can include merging an extension to the model-to-model transformation with the model-to-model transformation to produce an extended model-to-model transformation. Specifically, the merging step can include identifying insertion points for specified transform elements in the model-to-model transformation and inserting the specified transform elements at the identified insertion points in the model-to-model transformation to produce an extended model-to-model transformation. Subsequently, the extended model-to-model transformation can be dynamically applied to a source model in order to produce a target model.

20 Claims, 3 Drawing Sheets

EXTENDING EXISTING MODEL-TO-MODEL TRANSFORMATIONS

BACKGROUND OF THE INVENTION

1. Statement of the Technical Field

The present invention relates to field of software development and more particularly to the model driven development of a software application.

2. Description of the Related Art

Modern software systems have become increasingly pervasive and open-ended, and are expected to deliver critical computing services in a dependable manner across multiple, heterogeneous computing environments. To better manage the complexity of developing modern software systems, software development strategies can be employed which raise the level of abstraction at which software systems are conceived, implemented and evolved. Model-driven development (MDD) represents one such software development strategy in which models are the primary artifacts of software development.

Modeling complex applications has several general benefits which can include a better understanding of the business or engineering situation at hand, the construction and design of an application architecture, and the creation of visualizations of code and other forms of implementation. Although some may argue that application visualization alone does not constitute a model, the essence of modeling is abstraction and any visualization of code is indeed an abstraction in that application information can be selectively exposed while details deemed unnecessary or unwanted can be suppressed. Nevertheless, the terms "code model", "implementation model" or "platform-specific model" (PSM) are often used to qualify such abstractions from a higher-level, platform independent model (PIM) that does not have such direct relationships to program code.

In conventional MDD, visual models can be created from a methodological process that often begins with application requirements and culminates with a high-level architectural design model. Developers can create a detailed design model from which skeletal code can be generated to an integrated development environment. The integrated development environment, in turn, can be used to complete the detailed coding. Any changes to the code that affect the design model can be synchronized back into the model. Likewise, any model changes can be synchronized into the existing code.

Modern trends in MDD include software development tools and techniques that support the vision of the Object Management Group as framed by the "Model Driven Architecture" (MDA). The MDA advocates an approach in which models of software that abstract over technology-specific details are systematically transformed to deployable technology-specific implementations. In this regard, a transformation defines changes that are applied to a source model to produce a target model. While the models enjoy specific relationships between one another, the transformation steps are often a discontinuous jump forward rather than a specifiable mechanical transformation. The discontinuous jump is most noticeable in the early stages of design refinement and solution exploration where fundamental decisions are made by the software engineer in order to satisfy solution requirements.

Systematic support for model transformations is considered to be critical to the success of the MDA. Often referred to as a model-to-model transformation, the source and target models can be based upon a meta-model like the unified modeling language (UML), including customer specific meta-models. For example, the PIM can be a UML2 model marked up with stereotypes and the resulting PSM created by the transformation might be Java code modules. At present model-to-model transformations are manually driven and can require substantial expertise and development resources to perfect. Yet, as MDD matures, it will be desirable to automate the generation of a PSM from a PIM such that the transformation can fit the mold of a code generator.

Yet, the pre-specification of a transformation can address only a particular transformation scenario. As the specific needs of the end user change, however, so too will the scenario. Accordingly, each new scenario can require the new specification of a transformation. In this regard, much of the efficiencies gained by the automation of the transformation process can be lost. Thus, it will be desirable to extend a pre-specified transformation to accommodate the specific requirements of the end user without requiring the complete recreation of the transformation.

SUMMARY OF THE INVENTION

The present invention addresses the deficiencies of the art in respect to model-to-model transformations and provides a novel and non-obvious method, system and apparatus for extending an existing model-to-model transformation. In this regard, a method for extending a model-to-model transformation can include merging an extension to the model-to-model transformation with the model-to-model transformation to produce an extended model-to-model transformation. Specifically, the merging step can include identifying insertion points for specified transform elements in the model-to-model transformation and inserting the specified transform elements at the identified insertion points in the model-to-model transformation to produce an extended model-to-model transformation. Subsequently, the extended model-to-model transformation can be dynamically applied to a source model in order to produce a target model.

The dynamically applying step can include traversing a hierarchy for the source model; and, applying rules in the extended model-to-model transformation to objects in the hierarchy to produce the target model. For instance, the traversing step can include sequentially processing a list of transform elements in the extended model-to-model transformation. Moreover, the processing step can include loading content extractors among the transform elements; and, identifying other transform elements through the loaded content extractors in order to traverse the hierarchy. Finally, the dynamically applying step can include loading transformation rules among the transform elements; and, executing the loaded transformation rules on objects in the hierarchy to produce the target model.

A model-to-model transformation system can include a model-to-model transformation engine configured to dynamically accept a model-to-model transformation to apply to a source model in order to produce a target model. The system also can include model-to-model transformation extension logic coupled to the engine and programmed to merge an extension to a base model-to-model transformation with the base model-to-model transformation to produce an extended model-to-model transformation for processing in the engine. Each of the base and extended model-to-model transformations can include an ordered list of transform elements, which can be a transformation rule, a content extractor or a transform container. The extension, by comparison, can include at least one additional transform element and a specification of an insertion point in the base model-to-model transformation for each transform element defined by the extension. Notably, the extension can be defined in markup.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for the extension of model-to-model transformation in a model-to-model transformation engine. In accordance with the present invention, an existing model-to-model transformation can be extended by way of an extension to the transformation. The extension can identify portions of the transformation to be extended and the extension further can specify transform elements to be inserted into the identified portions of the transformation. Consequently, when the transformation is to be performed, the existing transformation can be merged with the extension to produce an extended transformation.

More particularly, a model-to-model transformation can include an ordered set of transform elements. Each transform element either can be a transformation rule programmed to produce a target object in a target model from a source object in a source model, a content extractor programmed to extract related objects in the source model for processing, or a transform which contains a subset of the transform elements. In this regard, the content extractor can refer to a transform which can contain transform elements for processing the related objects that the content extractor extracted from the source model. Notably, by executing the content extractors and transformation rules in the transformation according to an ordered set of transform elements, an arbitrary source model hierarchy can be traversed and transformed into a target model hierarchy.

Each of the transform elements can include logic programmed to achieve either the traversal of the source model hierarchy or the creation or update of the target model hierarchy. In this way, transform elements can be "executed". Likewise, the extension to the transformation can include one or more transform elements to be inserted at points in the ordered set of transform elements. To facilitate matters, a descriptor for the transformation can be provided which can describe the transformation. In a similar manner, a descriptor for the extension to the transformation also can be provided. As a result, the descriptor for the extension can be used to insert transform elements into the ordered set of the existing transformation to produce the extended transformation.

Figure 1:
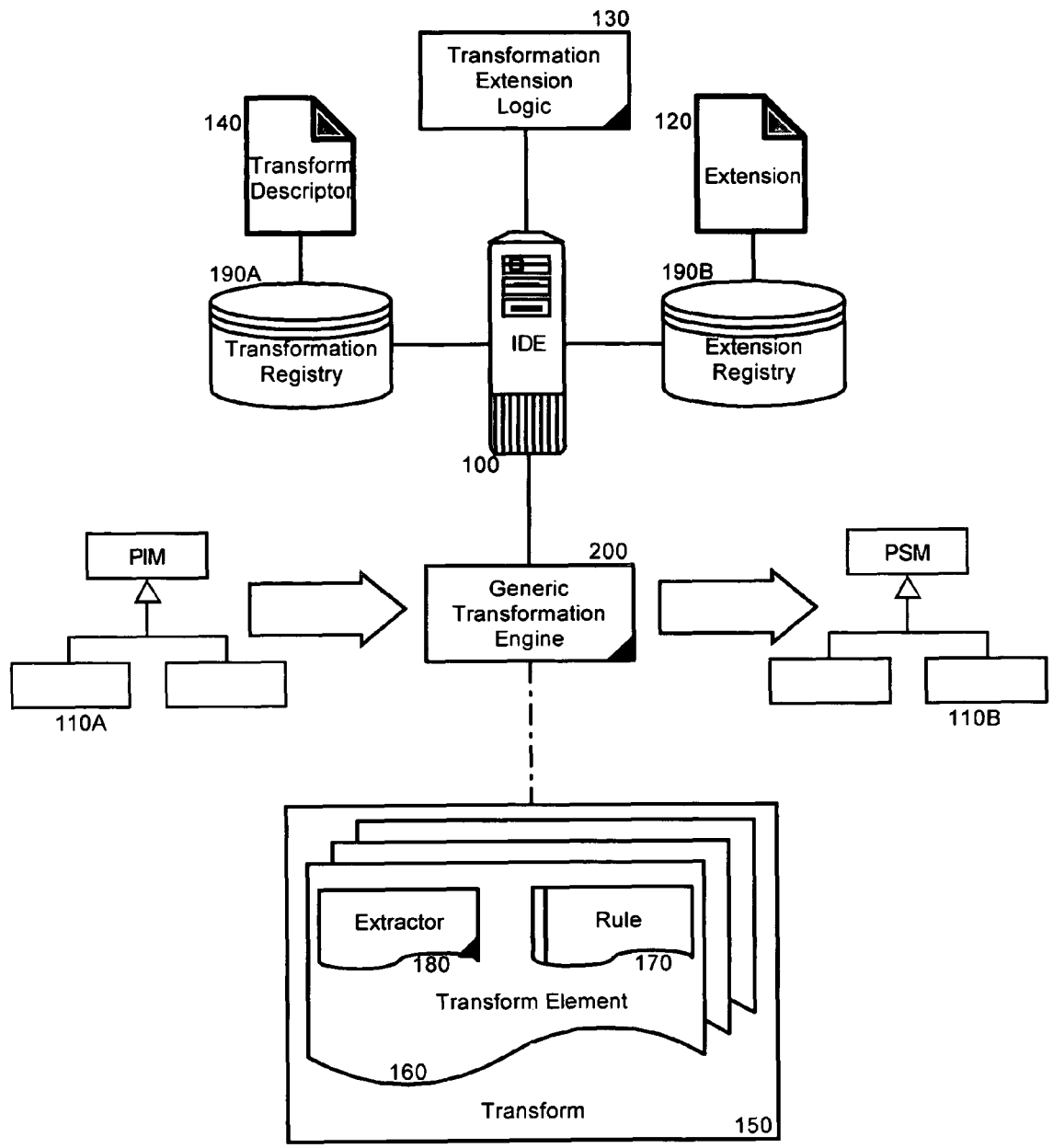
FIG. 1 is a schematic illustration of an extendible model-to-model transformation engine.

In more particular illustration, FIG. 1 is a schematic illustration of a model-to-model transformation engine 200 configured for extension in accordance with the present invention. The transformation engine 200 can be configured to interoperate with a development tool or development environment 100. The development environment 100 can be coupled to a registry of transformations 190A and corresponding descriptors 140 for registered transformations. The development environment 100 further can be coupled to a registry of extensions 190B to the registered transformations and corresponding descriptors 120. Importantly, transformation extension logic 130 can process the descriptor 140 for an existing registered transformation along with a descriptor 120 for an extension to produce an extended transformation.

The transformation engine 200 can be dynamically configured with the extended transformation to specify a manner in which a source model 110A can be traversed and transformed to produce a target model 110B. The extended transformation can include a transform 150 which can act as a container to a sequence of transform elements 160. Each transform element 160 can be a transformation rule 170, or a content extractor 180. Moreover, a transform element 160 can also be another transform 150, which is also referred to as a sub-transform.

In operation, the transform 150 can execute a source object in the source model 110A by sequentially executing all of its contained transform elements 160 with that same source object in the source model 110A. A transformation rule 170 can execute the source object in the source model 110A by converting the source object to one or more objects in the target model 110B. Finally, a content extractor 180 can execute a source object in the source model 110A by extracting the desired content of that source object and then executing each resulting object with an associated transform 150.

Figure 2:
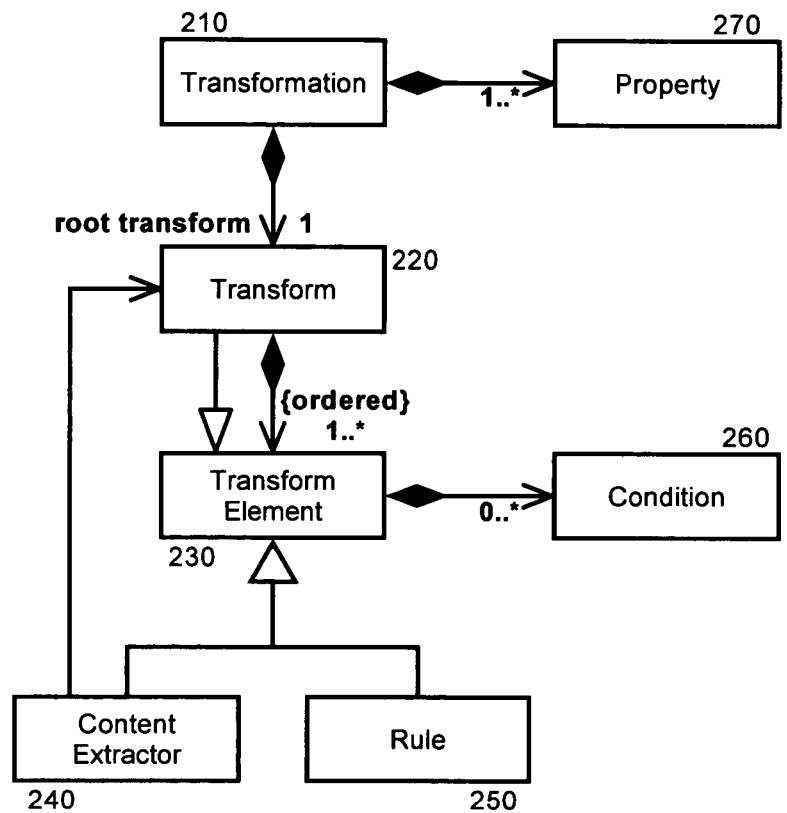
FIG. 2 is an object model of the model-to-model transformation engine of FIG. 1; and, FIG. 3 is a pictorial illustration of the extension of an existing model-to-model transformation.

To further illustrate the structure and function of the transformation engine of the present invention, FIG. 2 is an object model of a dynamically configurable model-to-model transformation engine. As shown in FIG. 2, a transformation 210 can include a reference to a transform 220. The transform 220 can include a reference to one or more transform elements 230. Each transform element 230 can be a content extractor 240 or a rule 250. Moreover, each transform element 230 can be a sub-transform 220. In this regard, a sub-transform can execute the same source object as if its contained transform elements were part of the parent transform.

A transformation 210 can include a single root transform 220 and many associated properties 270. Properties 270 can include name/value pairs that define data for the transformation 210 when the transformation 210 executes. The root transform 220 can include rules 250 for performing initial and final processing and content extractors 240 for processing the given source model object or objects. The connections between the transforms 220, rules 250 and content extractors 240 can determine how the source model is to be traversed. In some cases, the transform 220 can include direct references to rules 250 and extractors 240 and indirect references to other transforms 220 through the content extractors 240.

Importantly, the indirect references to other transforms enable the traversal of the source model. Direct references to other transforms, by comparison, referred to as sub-transforms, can enable the re-use of existing transforms including other transformations. Notably, the direct reference to other existing transforms can be utilized to create a new composite form of a transformation, or to clone an existing transformation that can subsequently be modified without affecting the original transform.

Referring once again to FIG. 2, a transformation 210 can be executed within a given context, which can provide access to one or more associated properties 270. The context can include a reference to one of the properties 270 for the current source object in process and another one of the properties 270 for the current target container object. The current source and target container ones of the properties 270 in the context can change as the source model is traversed and as the target model is generated. Optionally, though, before any transform element 230 can execute, first the transform element 230 must accept the current context. In that circumstance, if a transform element does not accept the current context, it is not executed.

The acceptance can be conditionally performed based upon a condition 260. For example, a rule designed to process an operation can have a condition that returns true if the source object is an operation thereby permitting the execution of the rule on that operation, and false otherwise, thereby blocking the execution of the rule. The conditional execution of a source object in a source model to produce a target object in the target model can be valuable to those seeking to automate the process of generating one or more detailed models from an abstract model. For example, by applying several transformations on models at various levels of abstraction, system architects can more easily generate all aspects of a business system including the front end interface, and the back end database control.

In operation, when a transformation 210 is executed, the root transform 220 is executed which results in the execution of any contained rules 250 and extractors 240. When executing an extractor 240, the extractor 240 returns a list of related source objects to be processed. Each of the related source objects in the list can be subsequently executed by the transform 220 associated with the extractor 240. Thus, in any transform 220, one or more rules 250 can be defined to perform the required processing of the source object into the target model. Additionally, one or more extractors 240 can be defined to perform the processing for the next level of objects in the source model. Thus, the contained rules, extractors and sub-transforms can be kept in a single ordered list within each transform, which can determine how the source model is to be traversed and processed.

Referring once again to FIG. 1, in operation, when a transformation is to be extended, first the transformation extension logic 130 can obtain an instance of the desired transformation. The transformation extension logic 130 subsequently can pass the obtained instance to the transformation extension registry 190B where all extensions specifying the transformation can be instantiated and merged into the transformation instance. In this way, the transformation extension logic 130 can decouple the transformation from the extension in the development environment 100.

Figure 3:
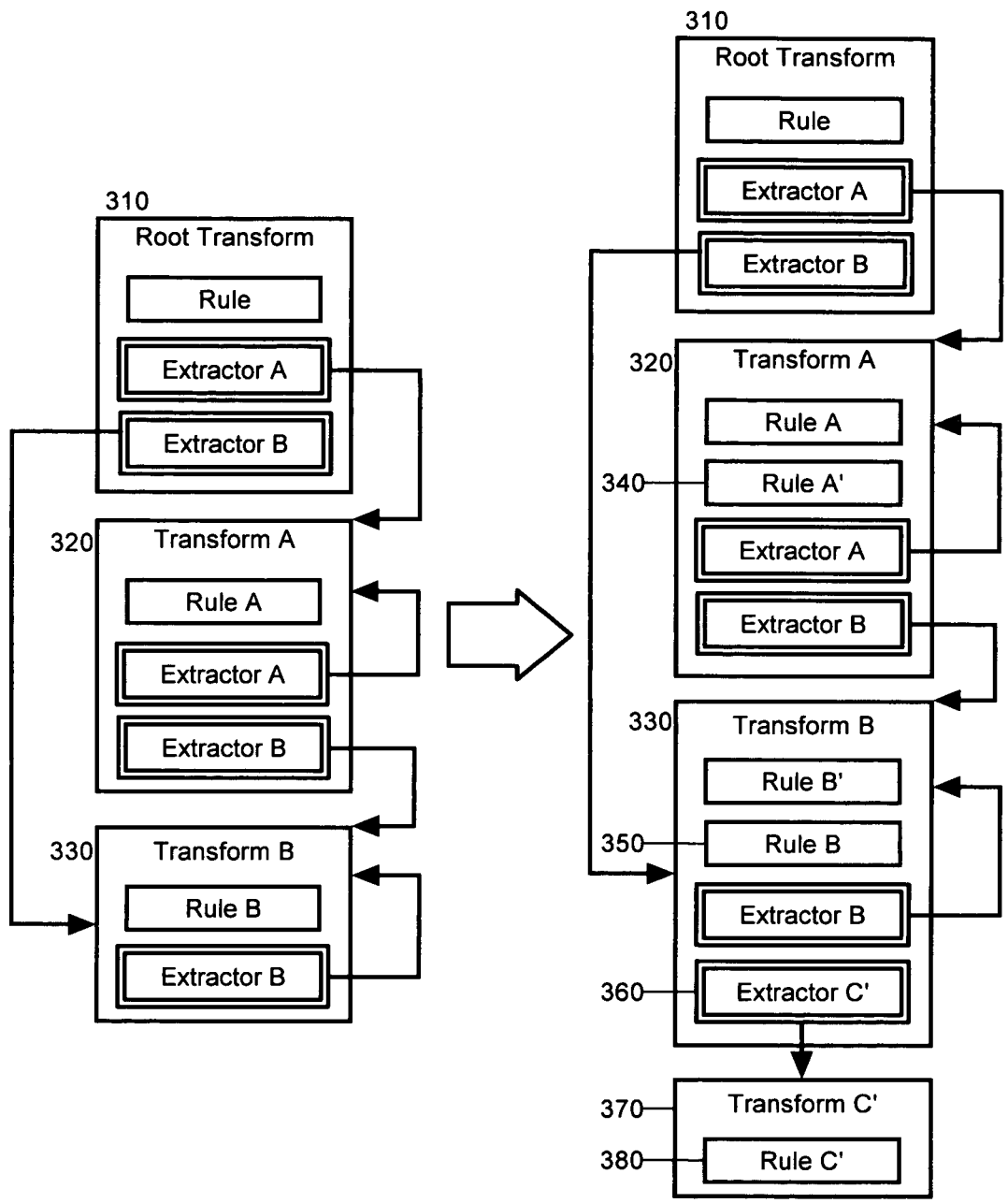

To facilitate the merger of the extension and the transformation, the extension information can be defined in markup using the identifiers of the target transformation and its internal transforms. Rules, extractors and transforms can be added to the transformation and are defined by their corresponding class name in the markup. For instance, referring to FIG. 3, a base transformation can include a root transform 310, a sub-transform "Transform A" 320 and another sub-transform "Transform B" 330. The following simplified markup can define an extension for the base transformation:

```
<TransformationExtension targetTransformation="base transformation" >
    <RuleDefinition id="Rule A'" class="*location*.NewRuleA"/>
    <RuleDefinition id="Rule B'" class="*location*.NewRuleB"/>
    <RuleDefinition id="Rule C'" class="*location*.NewRuleC"/>
    <ExtractorDefinition id="Extractor
    C'" class="*location*.NewExtractorC" />
    <TransformDefinition id="Transform
    C'"class="*location*.NewTransformC" />
    <ExtendTransform targetTransform="Transform A" >
        <AddRule id="Rule A'" index="1" />
    </ExtendTransform>
    <ExtendTransform targetTransform="Transform B"
        <AddRule id="Rule B'" index="0" />
        <AddExtractor id=" Extractor C'"
        transform="Transform C'" />
    </ExtendTransform>
    <ExtendTransform targetTransform="Transform C'"
        <AddRule id="Rule C'" />
    </ExtendTransform>
</TransformationExtension[SMG1]>
```

The information defined in the markup for this extension identifies the target transformation "base transformation" and defines new rules 340, 350, 380 extractor 360 and transform 370 that are to be added. Each transform element definition includes an identifier, a location such as a network address, and a corresponding class name. Once the new transform elements have been defined, the extension can define the target transforms within the target transformation that will be extended by inserting the desired transform elements to that transform with an optional list index. When an extractor is added, the markup can identify the associated transform that will process the related objects the extractor returns.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for extending a model-to-model transformation, the method comprising the steps of:

obtaining an instance of a model-to-model transformation in memory of a computer;

selecting all extensions that specify the model-to-model transformation and instantiating the selected extensions;

merging in the memory of the computer the extensions to the model-to-model transformation with the instance of the model-to-model transformation to produce an instance of an extended model-to-model transformation, the extensions each identifying portions of the model-to-model transformation to be extended, and the extensions each specifying different transform elements to be inserted into the identified portions of the model-to-model transformation.

2. The method of claim 1, wherein said merging step comprises the steps of:

identifying insertion points for specified transform elements in the model-to-model transformation; and, inserting said specified transform elements at said identified insertion points in the model-to-model transformation to produce an extended model-to-model transformation.

3. The method of claim 2, further comprising the step of dynamically applying said extended model-to-model transformation to a source model in order to produce a target model.

4. The method of claim 3, wherein said dynamically applying step comprises the steps of:

traversing a hierarchy for said source model; and, executing rules in said extended model-to-model transformation on objects in said hierarchy to produce said target model.

5. The method of claim 4, wherein said traversing step comprises the step of sequentially processing a list of transform elements in said extended model-to-model transformation.

6. The method of claim 5, wherein said processing step comprises the steps of:

loading content extractors among said transform elements; and, identifying other transform elements through said loaded content extractors in order to traverse said hierarchy.

7. The method of claim 5, wherein said applying step comprises the steps of:

loading transformation rules among said transform elements; and, executing said loaded transformation rules on objects in said hierarchy to produce said target model.

8. The method of claim 7, wherein said executing step comprises the step of conditionally executing said loaded transformation rules on objects in said hierarchy to produce said target model.

9. A model-to-model transformation data processing system comprising:

a computer with memory and at least one processor;

a model-to-model transformation engine executing in the memory of the computer and configured to dynamically accept an extended model-to-model transformation to apply to a source model in order to produce a target model; and, model-to-model transformation extension logic coupled to said engine and programmed when executing in the memory to select all extensions that specify a base model-to-model transformation, to instantiate the selected extensions, and to merge the extensions with said base model-to-model transformation to produce said extended model-to-model transformation for processing in said engine, the extensions each identifying portions of the model-to-model transformation to be extended, the extensions each specifying different transform elements to be inserted into the identified portions of the model-to-model transformation.

10. The system of claim 9, wherein each of said base and extended model-to-model transformations comprises an ordered list of transform elements, each element comprising a transformation rule and a content extractor, said content extractor referencing one other transform element in the transformation, said one other transform element also comprising an order list of transform elements.

11. The system of claim 10, wherein said extension comprises at least one additional transform element and a specification of an insertion point in said base model-to-model transformation for said at least one additional transform element.

12. A non-transitory machine readable storage medium having stored thereon a computer program for extending a model-to-model transformation, the computer program comprising a routine set of instructions which when executed in memory by a machine causes the machine to perform the steps of:

obtaining an instance of a model-to-model transformation;

selecting all extensions that specify the model-to-model transformation and instantiating the selected extensions;

merging the selected extensions with the instance of the model-to-model transformation to produce an instance of an extended model-to-model transformation, the extensions identifying portions of the model-to-model transformation to be extended, the extensions specifying different transform elements to be inserted into the identified portions of the model-to-model transformation.

13. The machine readable storage of claim 12, wherein said merging step comprises the steps of:

identifying insertion points for specified transform elements in the model-to-model transformation; and, inserting said specified transform elements at said identified insertion points in the model-to-model transformation to produce an extended model-to-model transformation.

14. The machine readable storage of claim 13, further comprising an additional set of instructions which when executed by the machine causes the machine to further perform the step of dynamically applying said extended model-to-model transformation to a source model in order to produce a target model.

15. The machine readable storage of claim 14, wherein said dynamically applying step comprises the steps of:

traversing a hierarchy for said source model; and, executing rules in said extended model-to-model transformation on objects in said hierarchy to produce said target model.

16. The machine readable storage of claim 15, wherein said traversing step comprises the step of sequentially processing a list of transform elements in said extended model-to-model transformation.

17. The machine readable storage of claim 16, wherein said processing step comprises the steps of:

loading content extractors among said transform elements; and, identifying other transform elements through said loaded content extractors in order to traverse said hierarchy.

18. The machine readable storage of claim 16, wherein said applying step comprises the steps of:

loading transformation rules among said transform elements; and, executing said loaded transformation rules on objects in said hierarchy to produce said target model.

19. The machine readable storage of claim 18, wherein said executing step comprises the step of conditionally executing said loaded transformation rules on objects in said hierarchy to produce said target model.

20. The system of claim 11, wherein said extension is defined in markup.

* * * * *